March 5, 1963    O. YEMMANS    3,079,694
TOOL STOCK CENTERING DEVICE
Filed Feb. 12, 1960    3 Sheets-Sheet 1
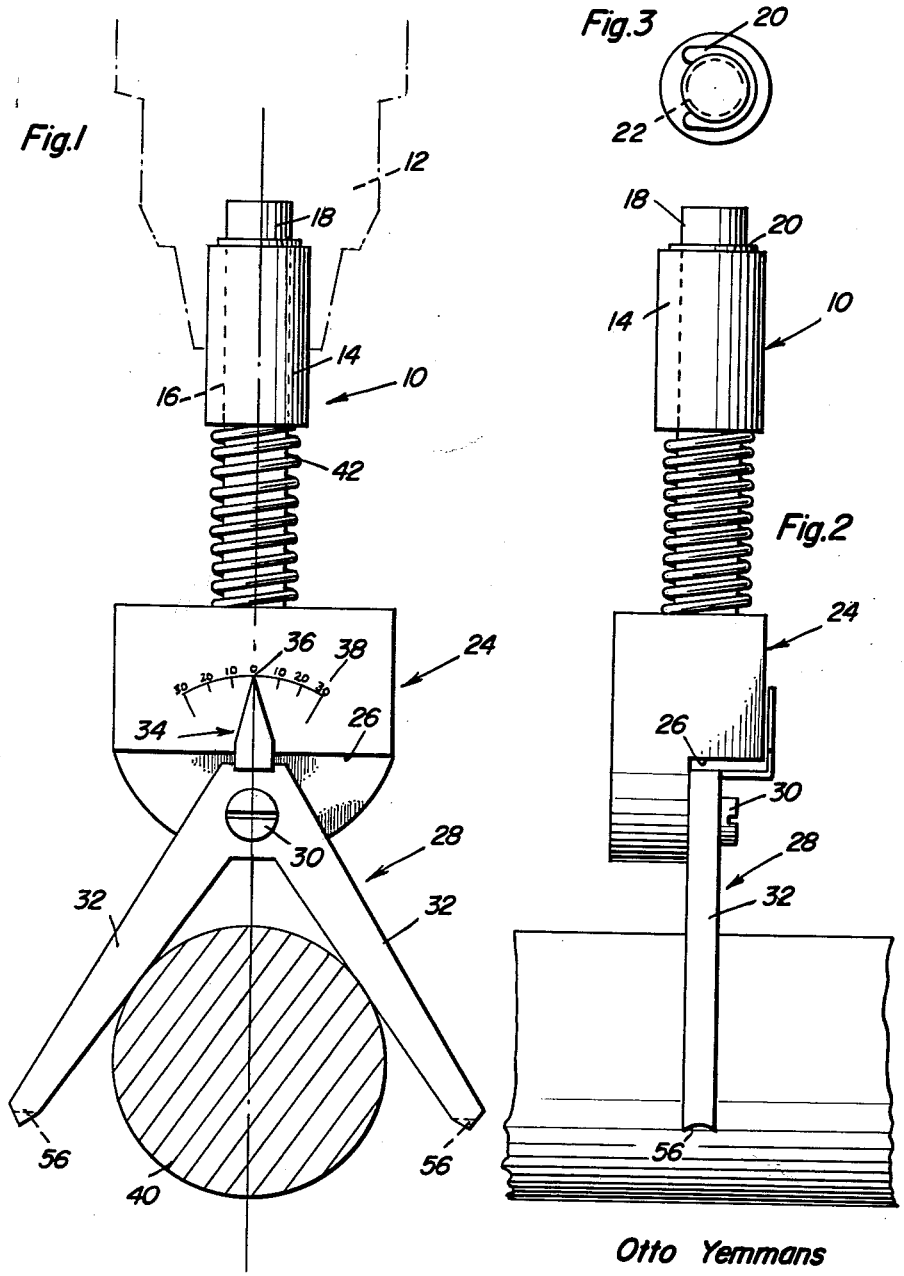
Otto Yemmans
INVENTOR.

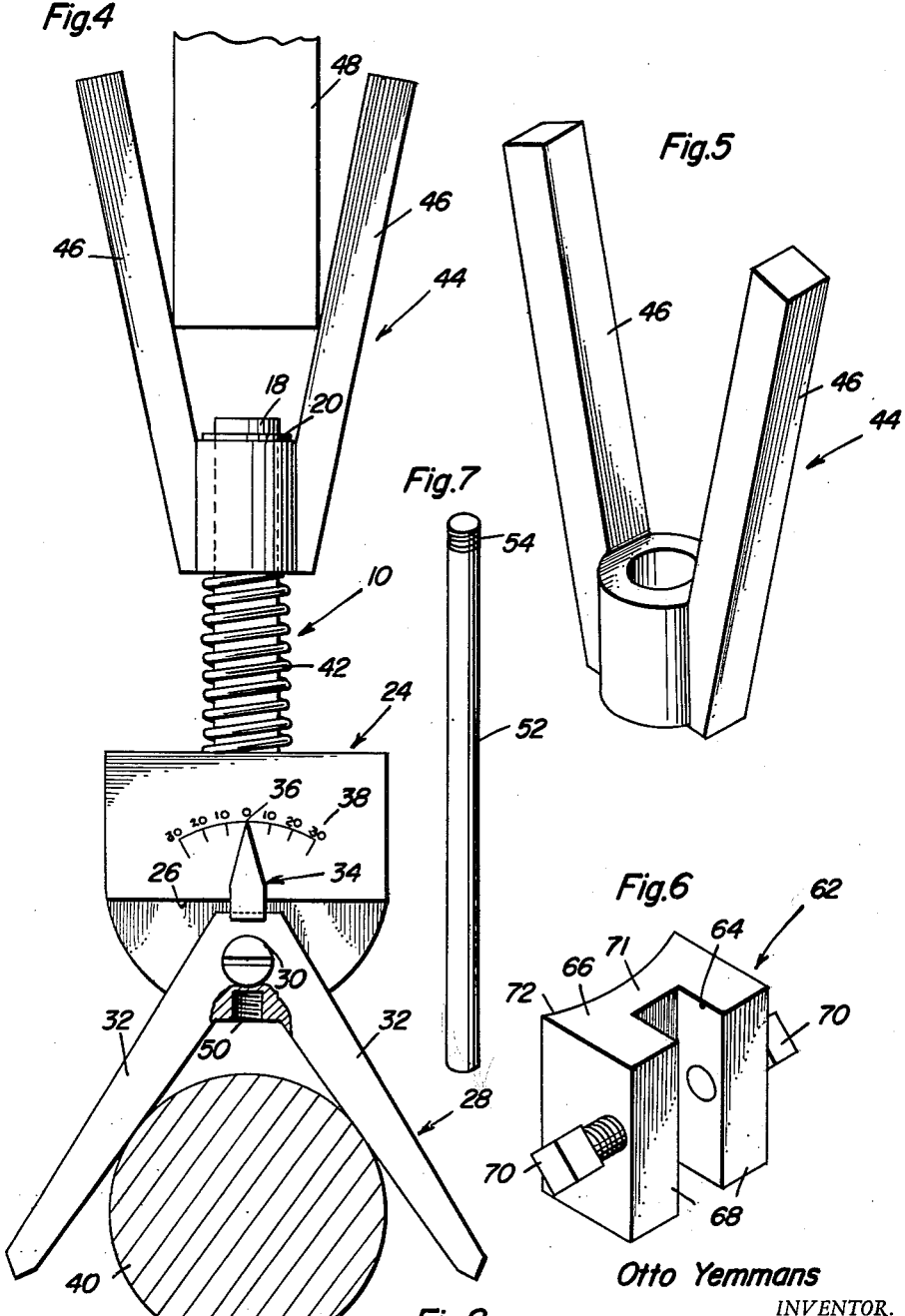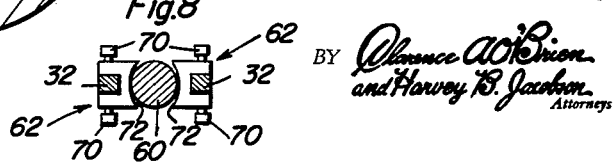
Otto Yemmans
INVENTOR.

March 5, 1963     O. YEMMANS     3,079,694
TOOL STOCK CENTERING DEVICE
Filed Feb. 12, 1960     3 Sheets-Sheet 3
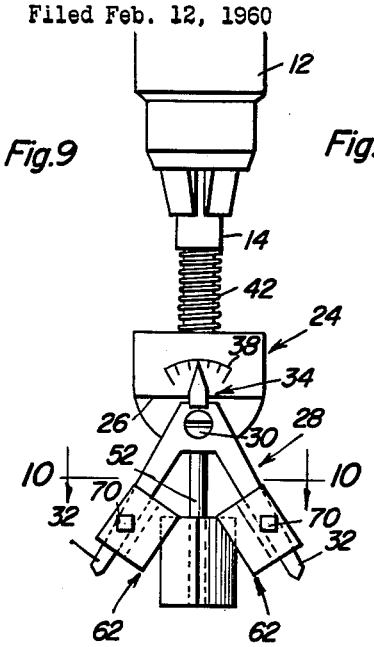
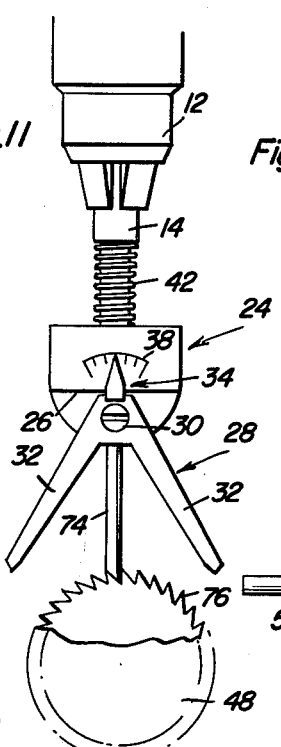
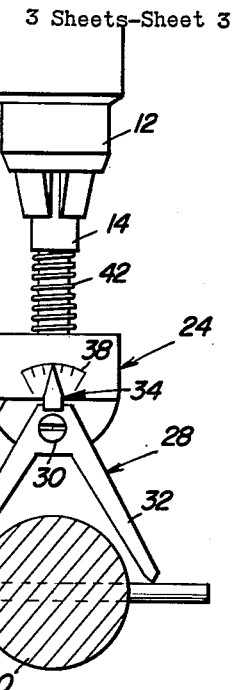
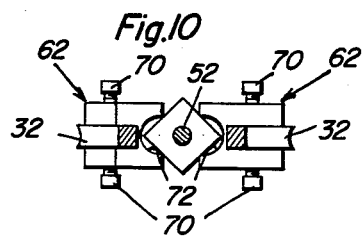
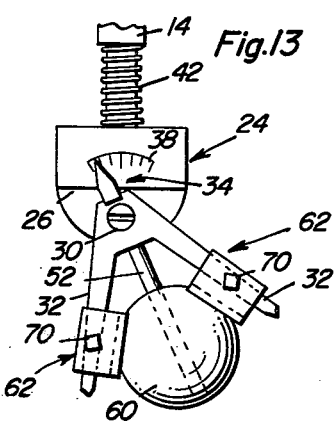
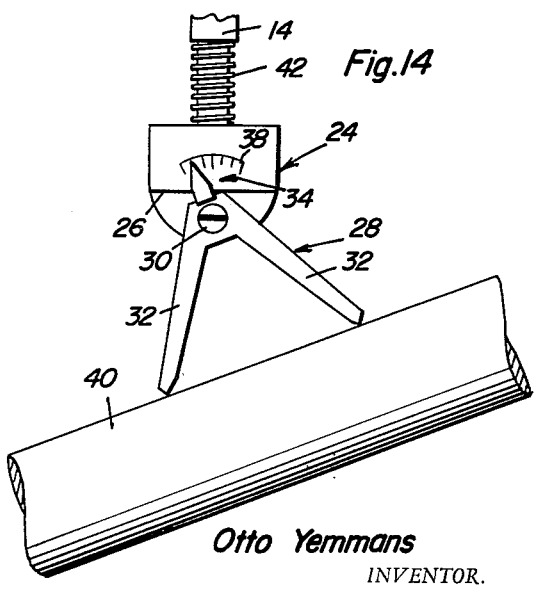
Otto Yemmans
INVENTOR.
BY Clarence A. O'Brien
and Harvey B. Jacobson
Attorneys

United States Patent Office 3,079,694
Patented Mar. 5, 1963

3,079,694
TOOL STOCK CENTERING DEVICE
Otto Yemmans, 469 W. Baker St., Clawson, Mich.
Filed Feb. 12, 1960, Ser. No. 8,306
7 Claims. (Cl. 33—185)

This invention relates to a novel and useful tool stock centering device, and more particularly to a tool which is specifically adapted for centering workpieces of various configurations relative to the cutting edge of a cutting tool powered by a drill press chuck or the like.

Heretofore it has been extremely difficult to center cylindrical, spherical or other symmetrically shaped objects relative to the cutting edge of a cutting tool so that the cut of the cutting tool would be accurately located relative to the true center line of the workpiece. The centering tool of the instant invention is particularly well adapted to center the axis of rotation of a drill press or the like with the exact center of a spherical workpiece or with the longitudinal center line of a cylindrical workpiece. Further, the centering tool is also particularly well adapted to align the axis of rotation of a drill press with the longitudinal center line of a cylindrical object as well as aligning the axis of rotation of a drill press with the longitudinal center line of a bar having a number of equal sides.

The various types of centering tools heretofore developed were adapted for use with workpieces of similar configuration and a different centering tool was required for each workpiece configuration. Therefore, many different centering tools were required.

It is the main object of this invention to provide a centering tool which may be used to properly orientate workpieces of various configurations with the axis of rotation of a drill press or other similar cutting tool.

A further object of this invention is to provide a centering tool which will enable proper positioning of workpieces such as cylindrical objects at desired angles relative to the cutting tool whereby inclined passages or the like may be formed through the workpieces to intersect the longitudinal center line of the workpiece.

Still another object of this invention is to provide a centering tool which may be used to quickly, easily and accurately position a workpiece relative to the axis of rotation of a drill press.

And a final object to be specifically enumerated herein is to provide a centering tool which will conform to conventional forms of manufacture, be of simple construction, and easy to operate so as to provide a device that will be economically feasible, long lasting and operable by even the unskilled machinist.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a front elevational view of the centering tool shown positioning the longitudinal axis of a rod at right angles to the axis of rotation of a drill chuck, the drill chuck being shown in phantom lines;

FIGURE 2 is a side elevational view of the centering tool shown in FIGURE 1 but with the chuck of the drill press removed;

FIGURE 3 is a top plan view of the upper portion of the centering tool seen in FIGURE 2 showing the manner in which one end of the support rod is secured through the sleeve;

FIGURE 4 is a front elevational view of the centering tool similar to that shown in FIGURE 1 but with a replacement sleeve for centering a milling wheel relative to the workpiece being shown in place of the sleeve adapted to be secured in the chuck of the drill press;

FIGURE 5 is an enlarged perspective view of the replacement sleeve;

FIGURE 6 is a perspective view of one of the adapters which may be secured to the divergent legs of the centering attachment for centering a spherical workpiece relative to the chuck of a drill press or for aligning the longitudinal axis of a cylindrical workpiece or any rod-like workpieces having an even number of equal sides relative to the axis of rotation of a drill press;

FIGURE 7 is a perspective view of a pilot shaft adapted to be secured between the diverging legs of the centering attachment for alignment with the longitudinal axis of the support shaft of the centering tool;

FIGURE 8 is a bottom plan view on somewhat a reduced scale of the centering attachment being used to center a spherical workpiece relative to the longitudinal axis of the support shaft of the attachment;

FIGURES 9 and 11 through 14 are front elevational views of the centering tool illustrating the different ways in which the device may be used for centering workpieces relative to the axis of rotation of a drill chuck; and FIGURE 10 is a horizontal sectional view taken substantially upon the plane indicated by the section line 10—10 of FIGURE 9.

Referring now more specifically to the drawings the numeral 10 generally designates the tool stock centering tool comprising the present invention which is shown secured in a drill chuck 12, see FIGURES 1 and 9 through 12. The centering tool 10 includes a cylindrical sleeve or guide means 14 adapted for securement in the drill chuck 12 with the sleeve 14 being provided with a smooth centrally disposed bore 16 which snugly, slidably and rotatably receives the upper portion of the support shaft 18, the latter being secured through the sleeve 14 by means of a snap retainer 20 seated within the peripheral groove 22 formed in the upper end of the support shaft 18.

Secured to the lower end of the shaft 18 is a body member generally designated by the reference numeral 24 having a transversely extending notch 26 formed therein through which the longitudinal axis of the support shaft 18 passes. Secured within the notch 26 is a centering attachment generally designated by the reference numeral 28 that is pivotally mounted for rotation about an axis intersecting and at right angles to the longitudinal axis of the support shaft 18 by means of pivot bolt 30.

The centering attachment 28 includes a pair of divergent legs 32 which extend downwardly from the body member 24. Secured to the upper end of the centering attachment 28 is a pointed indicator 34 which is secured to the attachment 28 in any convenient manner and is provided with a point as at 36. It is to be noted that the longitudinal axis of the centering attachment 28 is in exact coincidence with the longitudinal axis of the support shaft 18 when the point 36 of the indicator 34 is registered with the center of the indicia 38 formed on the body member 24. The divergent legs 32 are identical except that they are right and left handed and it will be noted, see FIGURE 1 in particular, that the legs 32 are disposed in equal angular relationship relative to the longitudinal axis of the attachment 28. Therefore, with the center of the indicia 38 lying upon a plane passing through the longitudinal axes of both the support shaft 18 and the pivot bolt 30, when the point 36 is registered with the center of the indicia 38 the longitudinal axis of the cylindrical rod 40 seated between the divergent legs 32 will be in direct alignment with the longitudinal axis of the support shaft 18 and therefore in alignment with the axis of rotation of the drill chuck 12.

An expansion spring 42 is disposed between the confronting surfaces of the sleeve 14 and the body member 24 to yieldably urge the body member 24 away from the sleeve 14. Thus, with the drill chuck 12 positioned a correct distance from the cylindrical rod 40, the expansion spring 42 will urge the body member 24 downwardly toward the cylindrical rod 40 until the latter is seated between the divergent legs 32. The positioning of the pointed indicator 34 may then be noted and if it is not in alignment with the center of the indicia 38, the chuck 12 may be moved in alignment with the cylindrical rod 40. In this manner a cylindrical rod-like workpiece may be centered relative to the axis of rotation of the drill chuck 12.

With particular attention now directed to FIGURES 4 and 5 of the drawings it will be noted that there is illustrated a replacement sleeve or guide means generally indicated by the reference numeral 44 which is similar to sleeve 14 but which is provided with upwardly divergent legs 46 similar to legs 32 which are positioned equally relative to the longitudinal axis of the sleeve 44. With the lower portion of the attachment 10 positioned in the same manner relative to the cylindrical rod 40 as in FIGURE 1, the upwardly divergent legs 46 may be used to center a milling wheel 48 in alignment with the longitudinal axis of the cylindrical rod 40 so that keyways or the like may be formed in the rod 40.

An internally threaded bore 50 is formed in the attachment 28 between the legs 32 thereof in the exact coincidence with the longitudinal axis of the attachment 28. A pilot shaft generally designated by the reference numeral 52 having a threaded end portion 54 is engageable in the bore 50 and may be used to check the positioning of bores formed in workpieces relative to their longitudinal axes or the pilot shaft may be used to check the angular relationship of a bore formed in a workpiece relative to the longitudinal center line of the support shaft 18, see FIGURES 9, 11 and 13.

With particular attention now directed to FIGURES 1, 2, 12 and 14, it will be noted that the lower ends of the divergent legs 32 are provided with concave surfaces which have their centers lying upon a single plane extending along the longitudinal axis of the support shaft 18 which is at right angles to the longitudinal axis of the pivot bolt 30. Therefore, a line passing through the centers of the concave surfaces 56 intersects the longitudinal axis of the support shaft 18. If it is desired to form a bore in either a cylindrical or spherical workpiece that will intersect an existing bore 58 formed in the workpiece passing through the center of that workpiece, a shaft 52′ of a diameter to be snugly received in the existing bore 58 is positioned therethrough whereupon the surfaces 56 may be centered relative to the longitudinal axis of the shaft 52′ which will align the axis of rotation of the chuck 12 with the center of the spherical workpiece 60. The spherical workpiece 60 may then be positioned in the desired position relative to the axis of rotation of the chuck 12.

It is to be noted the concave surfaces could also be V-shaped with the apices of the V-shaped surfaces being aligned with and perpendicular to the axis of rotation of the chuck 12. Therefore, it may then be seen that the type of surfaces is not important but only that it defines two spaced points of contact with the workpiece that are equally spaced from the plane passing through the center of the legs 32.

With particular attention now directed to FIGURE 13 of the drawings it will be noted that a pair of adapters 62 may be secured to the divergent legs 32 to enable a spherical workpiece to be centered in direct alignment with the axis of rotation of the chuck 12 or in angular relation thereto. Each of the adapters 62 includes a channel 64 for snugly and slidably receiving one of the legs 32. The adapters 62 each comprises a generally U-shaped body 66 whose leg portions 68 define the channel 64 and have secured therein locking screws 70 for engaging the opposite surfaces of a leg 32 disposed within the channel 64. The body member 66 is provided with a bight portion 71 having a concave surface 72 remote from the channel 64. The concave surfaces 72 extend in parallel relation to the channels 64 and it will be noted, see FIGURES 8, 9 and 10 in particular, that the adapters 62 are secured to the confronting surfaces of the legs 32 with the concave surfaces 72 thereof confronting each other.

It is to be noted that the concave surfaces do not have to extend across the entire corresponding face of the adapters 62 but that they may comprise only a fraction of that face.

With the use of the adapters 62 a spherical workpiece 60 may be centered relative to the axis of rotation of the chuck 12 or the axis of rotation of the chuck 12 may be aligned with the longitudinal center line of a rod which is symmetrical in transverse cross section.

With particular attention now directed to FIGURE 11 of the drawings it will be noted that the attachment 28, with a modified pilot shaft 74 secured thereto, may be used to check the angle of the teeth 76 of the milling wheel 48.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A tool stock centering tool for centering a workpiece relative to a cutting tool, said centering tool comprising an elongated body member having a longitudinal axis and adapted to be supported from guide means provided for positioning by a cutting tool relative to a workpiece and for longitudinal axial reciprocal movement relative to said guide means, a centering attachment pivotally secured to said body member for pivotal movement about an axis intersecting and at right angles to the longitudinal axis of said body member, said attachment including a pair of outwardly divergent legs, determining indicia formed on said body member, and a pointed indicator secured to said attachment registerable with said indicia, the apex of the angle formed by said legs and the point of said indicator being simultaneously registerable with the plane defined by the longitudinal axis of said body member and the axis of rotation of said centering attachment, the free ends of said legs being provided with concave surfaces with the axes of their radii lying upon a single plane extending along the longitudinal axis of said body member.

2. The combination of claim 1 including a guide sleeve comprising said guide means, said body member being axially reciprocable through said sleeve, said sleeve including a pair of outwardly divergent legs, said sleeve legs being adapted to embrace the opposite sides of a milling wheel at a point along the periphery thereof for centering the latter relative to a workpiece disposed between the outwardly divergent legs of said attachment.

3. The combination of claim 1, wherein said body member has a bore formed therein between said legs, a pilot shaft removably secured in said bore, the longitudinal axis of said bore being registerable with the longitudinal axis of said body member.

4. The combination of claim 1 including a pair of adapters secured to said legs, said adapters including confronting concave surfaces with the axes of their radii lying upon a single plane extending along the longitudinal axis of said body member.

5. A tool stock centering tool for centering a workpiece relative to the cutting edge of a cutting tool comprising a sleeve adapted to be gripped by a chuck of a drill press or the like, a support shaft having one end slidably disposed through the center of said sleeve, a body member fixedly secured to the other end of said shaft, resilient means disposed between said sleeve and said body member yieldably urging the latter away from said sleeve, a centering attachment pivotally secured to said body member for pivotal movement about an axis intersecting and at right angles to the longitudinal axis of said shaft, said attachment including a pair of outwardly divergent legs, determining indicia formed on said body member, and a pointed indicator secured to said attachment registrable with said indicia, the apex of the angle formed by said legs and the point of said indicator being simultaneously registrable with the plane defined by the longitudinal axis of said shaft and the axis of rotation of said centering attachment, said attachment having a bore formed therein between said legs, a pilot shaft removably secured in said bore, the longitudinal axis of said bore being registerable with the longitudinal axis of said support shaft.

6. A tool stock centering tool for centering a workpiece relative to the cutting edge of a cutting tool comprising a sleeve adapted to be gripped by a chuck of a drill press or the like, a support shaft having one end slidably disposed through the center of said sleeve, a body member fixedly secured to the other end of said shaft, resilient means disposed between said sleeve and said body member yieldably urging the latter away from said sleeve, a centering attachment pivotally secured to said body member for pivotal movement about an axis intersecting and at right angles to the longitudinal axis of said shaft, said attachment including a pair of outwardly divergent legs, determining indicia formed on said body member, and a pointed indicator secured to said attachment registerable with said indicia, the apex of the angle formed by said legs and the point of said indicator being simultaneously registerable with the plane defined by the longitudinal axis of said shaft and the axis of rotation of said centering attachment, the free ends of said legs being provided with concave surfaces with the axes of their radii lying upon a single plane extending along the longitudinal axis of said support shaft.

7. A tool stock centering tool for centering a workpiece relative to the cutting edge of a cutting tool comprising a sleeve adapted to be gripped by a chuck of a drill press or the like, a support shaft having one end slidably disposed through the center of said sleeve, a body member fixedly secured to the other end of said shaft, resilient means disposed between said sleeve and said body member yieldably urging the latter away from said sleeve, a centering attachment pivotally secured to said body member for pivotal movement about an axis intersecting and at right angles to the longitudinal axis of said shaft, said attachment including a pair of outwardly divergent legs, determining indicia formed on said body member, and a pointed indicator secured to said attachment registerable with said indicia, the apex of the angle formed by said legs and the point of said indicator being simultaneously registerable with the plane defined by the longitudinal axis of said shaft and the axis of rotation of said centering attachment, a pair of adapters secured to said legs, said adapters including confronting concave surfaces with the axes of their radii lying upon a single plane extending along the longitudinal axis of said support shaft.

References Cited in the file of this patent
UNITED STATES PATENTS

| | | |
|---|---|---|
| 2,398,066 | Whale | Apr. 9, 1946 |
| 2,455,076 | Magealson | Nov. 30, 1948 |
| 2,603,043 | Bontemps | July 15, 1952 |
| 2,674,045 | Lakomski | Apr. 6, 1954 |
| 2,782,519 | Gill | Feb. 26, 1957 |